3,070,943
MOWER WITH DEFLECTOR-SCRAPER MEANS
James E. Hoffman, Glenview, Ill., assignor to Roseman Mower Corporation, Morton Grove, Ill., a corporation of Illinois
Filed Dec. 29, 1959, Ser. No. 862,691
6 Claims. (Cl. 56—249)

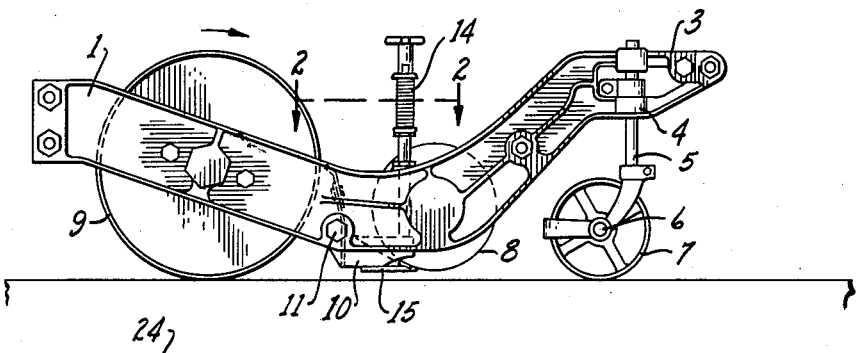

This invention relates to lawn mowers and has particular relation to an assembly including deflector-shield-scraper means in association with a cutter reel and a drive-roller.

One purpose of the invention is to provide a deflector shield and a deflector scraper in combination with a lawn mower reel and drive-roller.

Another purpose is to provide a lawn mower assembly having means for simultaneously controlling the course of cuttings created thereby and of maintaining particular elements of said assembly free from deleterious incrustation.

Another purpose is to provide, for association with a shoe and bed knife of a lawn mower assembly, a means for converting said assembly into an over-all channel-forming and scraper device for the cuttings created by said mower assembly.

Other purposes will appear from time to time during the course of the specification and claims.

I illustrate my invention more or less diagrammatically in the accompanying drawings, wherein:

FIGURE 1 is a side elevation illustrating a mower structure incorporating the invention with parts shown in dotted lines;

FIGURE 2 is a partial top plan view on an enlarged scale and taken on the line 2—2 of FIGURE 1;

FIGURE 3 is a partial side view in partial cross section taken on the line 3—3 of FIGURE 2;

FIGURE 4 is a detail view illustrating a blade portion of the deflector-shield-scraper element of my invention; and FIGURE 5 is a detail view illustrating an intermediate portion of the deflector-shield-scraper element of my invention.

Like parts are indicated by like numerals throughout the specification and drawings.

Referring now to the drawings, and particularly to FIGURE 1, the numeral 1 generally indicates a side frame member, it being understood that a similar member is arranged in parallel spaced relationship to the member illustrated at 1, a portion of said other frame member being illustrated at 2 in FIGURE 2.

A forward portion 3 of each of the frame members 1, 2 pivotally suspends, as in bearings such as indicated at 4, a vertical axle 5 which in turn rotatably carries, as at 6, a ground contacting support wheel 7. It will be understood that each of the frame members 1, 2 has a forward portion 3 and that each such portion 3 supports an axle such as that illustrated at 5, only one such axle 5, bearing element 4 and ground contacting member 7 being illustrated for convenience.

The pivotal or rotational suspension of vertical axle 5 is old in the art as illustrated in U.S. Letters Patent No. 1,561,569 issued November 17, 1925.

Rotatably carried by and between the frame members 1, 2 is a cutter reel indicated substantially schematically at 8. Rotatably mounted between and carried by the frame members 1, 2 at a point rearwardly spaced from the reel 8 is a ground-contacting drive roller 9. The drive roller 9 is connected by any suitable means (not shown) for transmitting rotational motion to reel 8 in response to rotation of roller 9 along the ground.

Adjustably pivoted between and carried by the frame members 1, 2, at a point positioned between the reel 8 and roller 9, is a shoe member 10 mounted for adjustment about a supporting pivot 11. The shoe member 10 has a rearwardly, upwardly inclined, major wall or plate-like surface extending from one to the other of frame members 1, 2 and indicated at 12. A pair of forwardly extending ears, one of which is indicated at 13, is secured to and extend forwardly from the opposite ends of the shoe 10 for engagement with an adjustment means, such as that illustrated at 14 in FIGURE 1, to position the surface 12 at an appropriate cutting-receiving position extending from a point rearwardly of and in substantial alignment with the lowermost portion of reel 8. It will be understood that two such means 14 may be installed, one at each end of the shoe 10; that the shoe 10 is pivotally arranged about the center 11 and that the element 14 may, for example, comprise a screw threaded structure engaging the bore in portion 13 and that by rotation of member 14 the shoe 10, which is movable with portion 13, may be raised or lowered in relation to the ground and about the pivot indicated at 11. Secured to the shoe 10 and extending forwardly therefrom is a bed knife 15, the forward cutting edge or knife portion 16 of which is arranged for juxtaposition with the blades of cutting reel 8 adjacent the lowermost point in their rotational travel about the axis of reel 8.

The adjustment of shoe 10, and the knife 15 carried thereby by element 14 is old in the art as is generally illustrated in Roseman Patent 1,561,569 referred to above.

The shoe 10 has a substantially vertical rear wall portion 17 to the rear surface of which a deflector shield member 18 is secured by any suitable means such as bolts, one of which is indicated at 19. The member 18 has a substantially vertical, lower plate-like portion 20 secured to wall 17 and a rearwardly, upwardly inclined, upper plate-like portion 21 extending from a point adjacent the upper edge of wall 17 and forming substantially a continuation of surface 12 of shoe 10. The plate-like portion 21 of member 18 serves to shield the lower forward quadrant of roller 9 from impingement of grass cuttings produced by cutter reel 8 and blade or knife 16 and to insure the direction or passage of dirt or other foreign matters scraped from roller 9 downwardly between cutter reel 8 and roller 9.

Secured to the plate-like portion 21 of shield 18 and extending upwardly rearwardly therefrom is a deflector scraper member 22, the same being secured to portion 21 by any suitable means such as the bolts indicated at 23. The member 22 has a major lower plate-like or flat strip portion 22a paralleling and forming substantially an extension of shield portion 21 and an upper, rearwardly inclined longitudinal edge portion 24 extending to a point adjacent the circumference of drive roller 9.

As best seen in FIGURE 5, the deflector shield member 18 has a plurality of spaced apertures 25 adjacent its lower edge for reception of attaching means, such as the bolts 19. The member 18 has a similar set of apertures 26 spacedly arranged along and adjacent its upper edge for reception of bolts 23. As best seen in FIGURE 4, the deflector scraper member has a plurality of spaced lateral slots 27 arranged in its major, lower portion for reception of bolts 23 and for adjustment in relation to shield 18 and roller 9.

The use and operation of my invention are as follows:

I provide, in effect, a channel for reception and direction of grass cuttings emanating from the cutting action of knife edge 16 and the blades of reel 8. The cuttings are thrown against shoe surface 12, shield 18, and deflector scraper member 22. Some of the cuttings may fall back toward the reel 8. Some may be carried around by the reel 8 for re-cutting providing an action in the nature of a mulcher.

Cuttings, and sometimes mud and other debris, often becomes incrusted upon the surface of roller 9 tending to interfere with its maximum performance. By positioning scraper portion 24 immediately adjacent the cylindrical surface of roller 9, I provide a means for limiting the amount of such incrustation without interfering with the free rotation of roller 9. Material thus removed from roller 9 is caused to flow or fall also into the reception channel formed by the members 22, 18, 12 and 15 immediately to the rear of reel 8.

It will be observed that member 22 is of slightly longer linear extension than member 18, it being understood that formations on the inner surfaces of frame members 1, 2, for example the bearings for pivot 11, are effective to fill in the otherwise existing openings which would exist between the opposite ends of member 18 and the adjacent frame member due to the fact that member 18 is of lesser length than the distance between the two frame members 1, 2.

The slots 27 facilitate varying adjustment of the overall width of the deflector-shield-scraper member 18, 22 to bridge the space between shoe 10 and roller 9 and to do so even though such space is subject to variance as a result of adjustment of shoe 10 and knife 15 by means 14.

As mowing continues, it will be realized that very fine cuttings will tend to throw over the sides of frame members 1, 2, downwardly between roller 9 and scraper 24 and some will be carried by the reel 8 and dropped prior to re-entry between the cutter bars of reel 8 and the bed knife portion 16. The deflector shield 18 and deflector scraper 22, however, are effective to preclude the continuous dumping of a large supply of fairly long cuttings over the wall 17 immediately in front of the roller 9 where they would otherwise tend to be picked up and incrusted upon the roller 9.

Whereas I have described and claimed a practical and operative device, nevertheless many changes may be made in size, shape, number and disposition of parts. I therefore wish my description and drawings to be taken as in a broad sense illustrative or diagrammatic, rather than as limiting me to my precise showing.

I claim:

1. In a mower, a mower frame including a pair of sidewalls, a cutter reel rotatably mounted and extending between said sidewalls, a drive roller rotatably mounted and extending between said sidewalls in spaced relation with said cutter reel, a plurality of wall members extending between said sidewalls and positioned between said reel and said roller, said members forming with adjacent portions of said sidewalls a continuous cutting-receiving channel extending from a point adjacent the lowest point of said reel to a point substantially adjacent the circumference of said roller in substantial horizontal alignment with the axis of said roller, one of said members having a knife edge positioned adjacent said cutter reel, another of said members having a scraper edge positioned adjacent said roller, said last named member being mounted between said side walls of adjustment toward and away from said roller independently of the position of said knife edge.

2. A mower assembly including a pair of sidewalls, a drive roller and a cutter reel extending between and rotatably supported on said sidewalls in spaced relation one to the other, a bed knife extending between said sidewalls adjacent the lowermost portion of said reel, and a deflector-shield-scraper structure having a relatively flat, continuous surface extending laterally between said sidewalls and extending from said bed knife in an upwardly inclined plane to a point adjacent the circumference of said roller and in substantial horizontal alignment with the axis of said roller.

3. For use with a mower structure having a pair of sidewalls, a cutter reel and drive roller spacedly mounted for rotation between said sidewalls and a shoe and bed knife adjustably pivoted on said sidewalls between said reel and roller and adjacent said reel, a deflector-shield-scraper structure comprising an elongated, substantially flat rectilinear plate-like assembly having a length sufficient to bridge the space between said sidewalls and a width sufficient to bridge the space between said shoe and a point immediadtely adjacent said roller and in substantial horizontal alignment with the axis of said roller, said structure being secured to and supported by said shoe and extending in an upwardly inclined plane from said shoe, said structure having a scraper edge mounted for adjustment on or between said side walls for adjustment toward and away from said roller independently of the position of said shoe and bed knife.

4. The structure of claim 3 wherein said structure is formed of two rectilinear plates, one of said plates having a plurality of spaced apertures positioned along its opposite longitudinal edges, the other of said plates having a plurality of laterally directed slots positioned along and adjacent one of its longitudinal edges.

5. A mower assembly including a pair of sidewalls, a forward cutter reel rotatably carried by and extending between said sidewalls, a rear drive roller rotatably carried by and between said sidewalls and spaced rearwardly of said reel, a shoe member comprising a plate adjustably pivoted on and extending between said sidewalls, said shoe member having a rearwardly, upwardly inclined wall surface positioned adjacent the lower, rear portion of said reel and having a linear extension substantially equal to that of said reel, a bed knife carried by and extending forwardly from said shoe member to a point adjacent the lowermost portion of said reel and a deflector-shield-scraper structure secured to said shoe member and extending rearwardly, upwardly therefrom to a point immediately adjacent said roller and in substantial horizontal alignment with the axis of said roller, said last-named member extending between said sidewalls and having a linear extension substantially equal to that of said roller.

6. In a mower assembly, a mower frame, a cutter reel rotatably mounted on said frame, a drive roller rotatably mounted on said frame and spaced from said cutter reel, a bed knife member positioned on said frame and having a forward knife portion in shearing relation with said cutter reel, said bed knife member having an inclined surface rising from said knife portion adjacent to said reel and extending toward said roller, a deflector shield member rising from said inclined surface and constituting substantially a continuation thereof, said shield member extending toward said roller, and a scraper member adjustably mounted on said shield member and having an edge portion extending to a point immediately adjacent the circumference of said roller, said scraper member edge portion lying in substantially the same horizontal plane as the axis of said roller, said bed knife member, shield member, and scraper member together bridging substantially the entire distance between said cutter reel and said roller within said mower frame, said scraper member being mounted for adjustment toward and away from said roller on said shield member independently of the position of said knife portion.

References Cited in the file of this patent

UNITED STATES PATENTS

| | | |
|---|---|---|
| 1,561,569 | Roseman | Nov. 17, 1925 |
| 1,800,113 | Stokes | Apr. 7, 1931 |
| 1,834,964 | Nichols | Dec. 8, 1931 |
| 2,268,226 | Ronning | Dec. 30, 1941 |
| 2,696,696 | Tigerman | Dec. 14, 1954 |
| 2,815,524 | Mitchell | Dec. 10, 1957 |

FOREIGN PATENTS

| | | |
|---|---|---|
| 270,946 | Great Britain | May 19, 1927 |